June 30, 1964  H. WEISSMAN  3,139,479
SPECTACLE FRAME
Filed Nov. 7, 1961
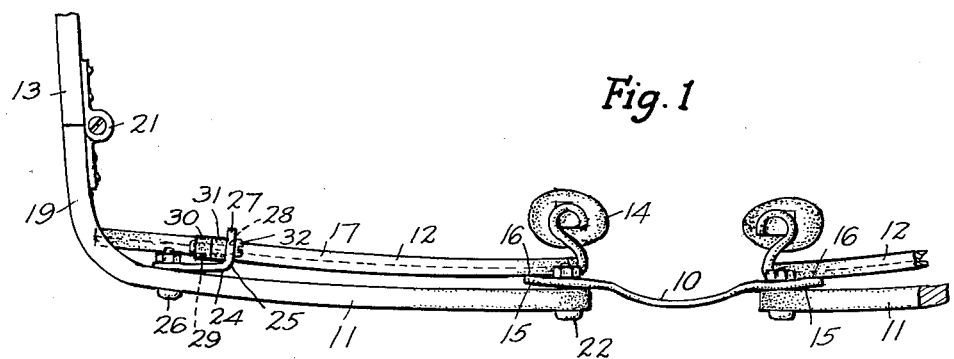
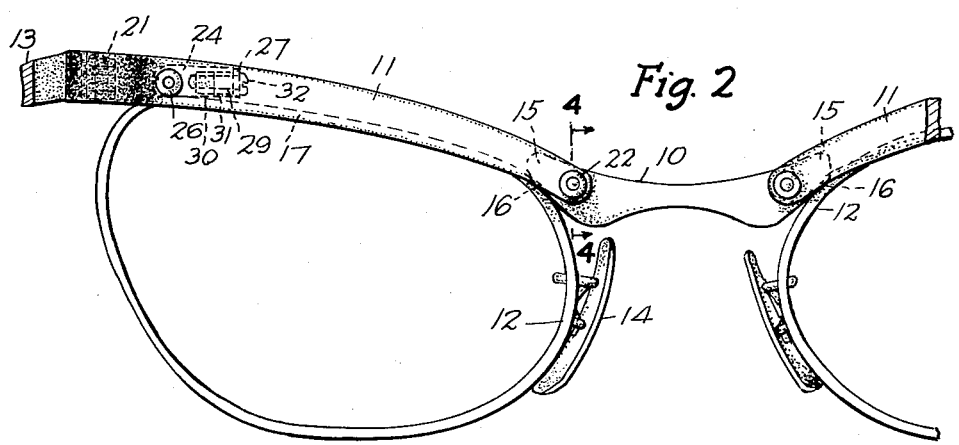
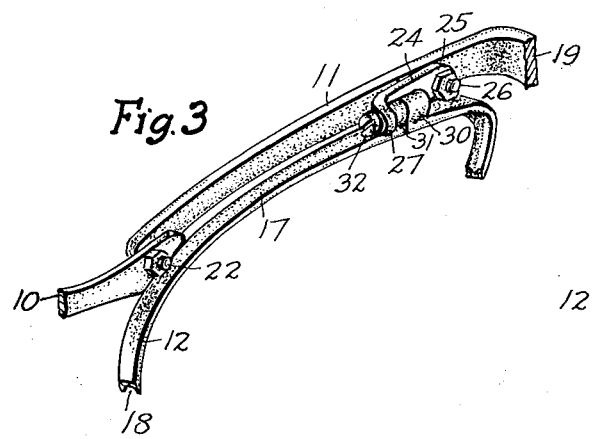
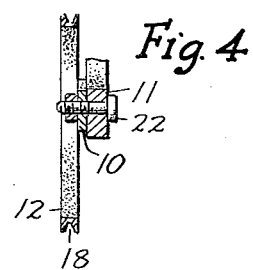
INVENTOR.
Harry Weissman
BY *Harry Jacobs*
ATTORNEY

3,139,479
SPECTACLE FRAME
Harry Weissman, Great Neck, N.Y. (% Paramount Optical Mfg. Corp., 60—06 39th Ave., Woodside 77, N.Y.)
Filed Nov. 7, 1961, Ser. No. 150,682
4 Claims. (Cl. 88—41)

This invention relates to spectacle frames and particularly to all-metal frames having parts of metal which can be soldered and removable and replaceable parts of non-solderable metal such as aluminum.

Aluminum has come into use to a large extent for spectacle frames or for parts thereof such as top brow pieces (frequently termed "plaques"), and temples because of the durability of aluminum, its light weight, workability, adaptability for coloration and engraving and its relatively low cost. However, since it is impractical to solder aluminum, difficulties have been met in properly connecting aluminum parts such as the top plaques and temples to each other or to the bridge and eyewires made of solderable metals such as the gold-filled metal customarily used for such parts.

The present invention therefore contemplates the provision of simple and efficient means for removably and replaceably connecting non-solderable aluminum plaques to the bridge and eyewires in such a manner as to conceal the top parts of the eyewires when the frame is in use, while permitting the eyewire to yield and to adjust itself to variations, within a limited range, in the shape and size of the lens inserted thereinto, such means including the usual screw for holding together the ends of the split eyewire, the screw serving to hold the plaque to the eyewire through the intermediary of a suitable bracket.

The invention further contemplates the provision of easily accessible means for removably supporting the plaque in forward spaced relation to its adjacent eyewire, whereby the eyewire is free to adjust itself and is unrestrained throughout its circumference except at the spaced apart points where it is connected to the bridge and to the top plaque, respectively.

The various objects of the invention will be clear from the description which follows, and from the drawings, in which—

FIG. 1 is a fragmentary top plan view of a spectacle frame which is symmetrical about its center line, part of the frame being omitted to save space.

FIG. 2 is a front elevational view of FIG. 1.

FIG. 3 is a fragmentary perspective view of the rear top portion of the frame showing the bridge, plaque, eyewire, and the connection therebetween.

FIG. 4 is a vertical sectional view, taken on the line 4—4 of FIG. 2, showing the connection at the bridge.

As is now quite usual, metallic eyewires and bridges are frequently secured permanently together, the top part of the eyewire being received in a metallic or non-metallic or composition top plaque. The plaque frequently carries the temple and often receives therein the clamping tubes customarily provided at the ends of the split eyewire, as well as the top part of the eyewire, thereby making access to the adjusting screw for the clamping tubes difficult, and so constraining the eyewire that only the sides and lower parts thereof can yield when a lens is to be removed or inserted thereinto, unless the plaque is completely removed from the eyewire.

In the form of the invention illustrated herein, the eyewire is constrained only two widely spaced apart points of its top part, one point being the split joint at the ends of the eyewire, which point is exposed at the rear of the top plaque but which is concealed from view from the front, and the other point being at the intersection of the eyewire with the bridge. As shown, the bridge 10 connects the plaques 11 with the eyewires 12. The bridge and eyewires are of suitable solderable metal, while the plaques 11 and temples 13 are of non-solderable aluminum. The usual nose pads 14 are mounted by soldering the metal supports thereof to the eyewires. The bridge is generally concave upwardly to provide the upswept wing-like end parts 15, each of which is in contact with the front surface of an eyewire 12 at a point 16. At such point, the eyewire is soldered to the wing 15 in a position wherein the lower edge of the top portion 17 of the eyewire is directly behind the lower edge of the plaque 11. While no part of the spectacle lens is cut off from use by the plaque, the plaque nevertheless conceals the top portion 17 of the eyewire from being seen from the front, without interfering with the insertion of a lens into the groove 18 of the eyewire.

The plaque is of flat strip stock of substantially rectangular cross section throughout, having its end part bent into a rearwardly directed temple-holding end portion 19 to which the temple 13, preferably of aluminum, is hinged as by means of the hinge 21, whereby the plaque and temple may be removed from the remainder of the frame as a unit should it be desired to substitute a plaque and temple of a different color or shape. To removably fasten the plaque and temple unit to the bridge and eyewire, while minimizing the constraint to which the eyewire is subjected, the nasal end of the plaque is bolted to the front face of the bridge by means of the headed bolt 22 passing through the bridge wing 15 and the plaque, and a suitable lock nut at the rear end of the bolt. The bridge wing is thereby interposed between the eyewire and the plaque whereby the eyewire becomes arranged in rearward spaced relation to the plaque. To maintain such spaced relation while adjustably supporting the other end of the eyewire, the long leg 24 of the L-shaped bracket 25 is pivotally bolted to the plaque by the bolt 26 which is similar to the bolt 22. Such bolt permits the shorter rearwardly projecting leg 27 of the bracket to be swung about the bolt as a pivot sufficiently to insure proper alignment of the hole 28 in said leg 27, with the bores 29 in the clamping tubes 30, 31 at the split apart ends of the eyewire. As shown, the bracket 25 is of flat strip material of substantially uniform width and thickness. The shorter leg 27 thereof is integrally joined to the longer main leg 24 by a substantially 180° bend. The tube 30 being internally threaded, the eyewire is closed and securely held to the bracket after the lens is inserted thereinto, by passing the screw 32 first through the hole 28 of the bracket leg 27 and then through the tube 31 into engagement with the threads of the tube 30. On tightening the screw 32, not only is the bracket pressed firmly against the clamping tubes thereby to hold the plaque adequately in place, but the clamping tubes themselves are also drawn together around the lens therein to close the eyewire.

The upper and lower edges of the plaque are unmutilated and free of recesses, cut-outs or holes owing to the manner of assembling the bridge temple and eyewire to the rear face thereof, whereby the plaque can remain quite thin and relatively inexpensive.

It will be noted that the screw 32 serves the double function of closing the eyewire and securing the plaque; that the eyewire is permanently constrained only at the soldered connection 16 at the bridge and temporarily constrained at the leg 27; that the eyewire and screw 32 are exposed at the rear and are easily accessible; that the eyewire can yield to a practical extent throughout its circumference when the screw 32 is sufficiently loosened or removed and thereby can be adjusted to a considerable range of variations from the appropriate shape and dimensions of the fitting lens; that the aluminum temple and plaque require no soldering while still being held adequately in place for removal and replacement; that the bracket constitutes a strong, positive, exposed and readily accessible connection which may readily be adjusted for alignment purposes should inaccuracies in alignment of the holes in the leg 27 and the clamping tubes 30, 31 occur, and that the various objects of the invention have been effectively attained in a simple and relatively inexpensive manner.

While a certain specific form of the invention has herein been shown and described, various obvious changes may be made therein without departing from the spirit of the invention defined by the appended claims.

I claim:

1. In a spectacle frame, a bridge of solderable metal of substantially uniform thickness having a pair of opposed terminal wings each having a hole therethrough, said wings being substantially coplanar, a pair of eyewires each of solderable metal and each preshaped into a resilient split ring having the split thereof at the top for supporting and encompassing a lens, each eyewire having a substantially planar front face, solder at one marginal point of each wing permanently securing the rear face of said wing to the nasal portion of the front face of an eyewire and thereby constraining the eyewire at said point to maintain the position thereof relatively to the bridge, the bridge being thereby arranged wholly in front of the eyewires, a pair of coaxial clamping tubes at the respective ends of each eyewire, one of the tubes being internally threaded and the other being unthreaded, a screw passing through said one of the tubes and threaded to the other tube, a pair of separate and spaced apart plaques each of a strip of aluminum of substantially uniform thickness greater than that of the bridge, and each having a rearwardly extending bend at the temporal end thereof, each plaque terminating, at the nasal end thereof, on a wing with part of the rear surface of the plaque in removable engagement with and overlapping the front planar surface of the wing and projecting forwardly beyond the bridge, the plaque having a hole therethrough in registration with the hole in said wing and having a second hole therethrough between and in spaced relation to the tubes and the bend and being otherwise continuous and smooth at the surfaces thereof, a temple hinged to the free end of said bend, and means for removably and replaceably securing each of the plaques and the temple thereon in operative position at the top part of an eyewire in front of the tubes to conceal said tubes from view from the front and constraining the eyewire at a second point against a change in position, the operative position of the plaque being such that part thereof between the nasal end and the bend is arranged in forward spaced relation to the planar front face of the adjacent eyewire by an amount substantially equal to the thickness of the bridge to provide a space between the plaque and the eyewire, said means including a bolt at the nasal end of the plaque passing through the registering holes in the wing and the plaque and having a nut thereon bearing against the rear face of the wing, said means further including a member arranged at the temporal end of the eyewire and in the aforesaid space for removably and replaceably securing the plaque at the aforesaid second point to a tube of the adjacent eyewire, the member being of uniform thickness substantially equal to the thickness of the bridge and of lesser vertical width than that of the plaque and of greater length than that of, and extending past, the tubes and having a front planar surface in contact with part of the rear surface of the plaque and substantially coplanar with the front surface of the nearer wing and having a rear surface substantially coplanar with that of said wing, one end of said member being secured to the unthreaded tube, the other end part of said member having a hole therethrough in outward spaced relation to the threaded tube, the axis of the last mentioned hole being substantially perpendicular to the axis of the tubes and in registration with the second hole in the plaque, and a bolt passing removably through the last mentioned holes in the member and the plaque and including a nut bearing against the rear planar surface of the member.

2. In a spectacle frame, a bridge, split eyewires each having a planar front face soldered to the rear face of the bride and each having a pair of clamping tubes one at one end of the eyewire and the other at the other end of the eyewire, a pair of separate spaced apart plaques each of flat strip aluminum and each arranged in front of the top part of an eyewire and in forward spaced relation thereto to provide a space therebetween substantially equal in width to the thickness of the bridge, the rear surface of the nasal end part of the plaque overlapping the front surface of an end part of the bridge and thereby arranging the plaque wholly in front of the bridge, first means passing removably through the plaque and the bridge for removably and replaceably securing the nasal end of the plaque to the bridge, a connecting member for each eyewire, the member being of flat strip material and terminating at one of the ends thereof at a first one of the pair of tubes on the eyewire, the other end of the member having a hole therethrough and terminating at a substantial distance beyond the other of said pair of tubes, second means connecting the member to one of said pair of tubes and adjustably connecting the tubes to each other, the member being arranged in said space with the front face thereof in contact with part of the rear face of the adjacent plaque and being of substantially the thickness of the bridge and substantially coplanar with the overlapped part of the bridge, and third means removably passing through the hole at said other end of the member and through the adjacent plaque for removably, solderlessly and replaceably securing the member to the adjacent plaque, the peripheral edges of the member being out of contact with the adjacent eyewire and the plaque and being exposed, each of the eyewires being thereby free of restraint except at two spaced apart points, one of said points being where the eyewire is soldered to the bridge and the other of said points being where the member is secured to a tube by said second means.

3. The spectacle frame of claim 2, the member being L-shaped and having a shorter leg at one end thereof and a longer leg substantially perpendicular to and integrally joined to the shorter leg by a bend, the shorter leg abutting against the end surface of the first tube and being otherwise separate from said first tube, the hole in the shorter leg being arranged substantially coaxially of the tubes, the other of said tubes being threaded, said second means comprising a screw passing through said last mentioned hole and through said first tube and screwed into the threaded tube whereby removal of said screw releases the member and the plaque from the eyewire and permits enlargement of the opening in the eyewire.

4. In a spectacle frame, a split eyewire and a plaque of relatively thin flat strip aluminum of uniform thickness throughout arranged at the upper part of the eyewire, a solderable bridge having the rear face thereof soldered to the front face of the eyewire and being thereby arranged wholly in front of the eyewire, a bolt passing through and removably securing the nasal end part of the rear face of the plaque in overlapping relation to the front face of an end portion of the bridge whereby the bridge is interposed between and spaces apart the nasal end part of the eyewire and the plaque to form a space between the upper part of the eyewire and the plaque, an exposed L-shaped connecting member of substantially the same thickness as the bridge and having a flat longer leg, a flat shorter leg and a substantially 90° bend integrally joining the legs, a second bolt removably securing the flat front face of the longer leg to and in face to face contact with the rear face of the plaque adjacent the temporal end of the plaque, the member being arranged in said space and being substantially coplanar with the overlapped part of the and cooperating with the bridge and the plaque to form and to maintain said space, a first clamping tube secured to one end of the eyewire, a second internally threaded clamping tube secured to the other end of the eyewire, and a screw arranged coaxially of the tubes and passing loosely through the shorter leg and through the first tube and into the threaded tube for securing the member to the second tube independently of the second bolt and the plaque.

References Cited in the file of this patent

UNITED STATES PATENTS

| | | |
|---|---|---|
| 2,625,079 | Singer | Jan. 13, 1953 |
| 2,633,059 | Lindblom | Mar. 31, 1953 |
| 2,682,199 | Weissman | June 29, 1954 |
| 2,778,270 | Pomerance | Jan. 22, 1957 |
| 2,887,008 | Gross | May 19, 1959 |
| 2,974,567 | Lorenzo | Mar. 14, 1961 |
| 3,071,042 | Radziwon | Jan. 1, 1963 |

FOREIGN PATENTS

| | | |
|---|---|---|
| 827,486 | Great Britain | Feb. 3, 1960 |